US008406565B1

(12) United States Patent
Schildan

(10) Patent No.: US 8,406,565 B1
(45) Date of Patent: Mar. 26, 2013

(54) REGION REASONING FOR IMAGE PROCESSING GRAPHS

(75) Inventor: Axel Schildan, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1180 days.

(21) Appl. No.: 12/198,329

(22) Filed: Aug. 26, 2008

(51) Int. Cl.
*G06K 9/00* (2006.01)

(52) U.S. Cl. ........ 382/282; 382/190; 382/195; 382/201; 382/227; 717/132; 717/144; 717/156; 345/634

(58) Field of Classification Search .................. None
See application file for complete search history.

(56) References Cited

U.S. PATENT DOCUMENTS

| 5,808,625 | A | * | 9/1998 | Picott et al. | 345/440 |
|---|---|---|---|---|---|
| 5,929,864 | A | | 7/1999 | Picott et al. | |
| 6,972,760 | B2 | * | 12/2005 | Iourcha et al. | 345/421 |
| 7,414,626 | B1 | | 8/2008 | Picott | |
| 7,589,719 | B2 | * | 9/2009 | Owens et al. | 345/419 |
| 2001/0055015 | A1 | | 12/2001 | Iourcha et al. | |
| 2002/0166105 | A1 | * | 11/2002 | Teig et al. | 716/14 |
| 2006/0038811 | A1 | * | 2/2006 | Owens et al. | 345/418 |

OTHER PUBLICATIONS

"A Model for Efficient and Flexible Image Computing," Shantzis, Jul. 1994, ACM, pp. 1-8.*
Shantzis, "A Model for Efficient and Flexible Image Computing," Jul. 1994, ACM, pp. 1-8.*
Brodsky et al., "Binary Backpropagation in Content Addressable Memory," Jun. 17-21, 1990, IEEE, vol. 3, pp. 205-210.*
"Directed acyclic graph," from Wikipedia, edited by Chris Howard May 8, 2008, http://en.wikipedia.org/w/index.php?title=Directed_acyclic_graph&oldid=211076921, 3 pages.
Michael A. Shantzis "A model for efficient and flexible image computing," International Conference on Computer Graphics and Interactive Techniques, Proceedings of the 21$^{st}$ annual conference on Computer graphics and interactive techniques, 1994, 11 pages.
Jonathan Swartz, Brian C. Smith, "A Resolution Independent Video Language," ACM Multimedia 95—Electronic Proceedings, San Francisco, California, Nov. 5-9, 1995, 11 pages.
"GEGL-0.0.16," GEGL (Generic Graphics Library), http://www.gegl.org/, last updated Feb. 27, 2008, 7 pages.

* cited by examiner

*Primary Examiner* — John Lee
(74) *Attorney, Agent, or Firm* — Fish & Richardson P.C.

(57) ABSTRACT

Systems, methods, and apparatus, including software tangibly stored on a computer readable medium, involve image processing. An image processing graph includes multiple nodes that each correspond to an image processing operation. Input image data relating to a particular input image is received. Region of interest data defining an output image region to be generated based on the input image data is received. A domain of defined node output data is identified for each of the nodes using the input image data, and the graph is traversed in a first traversal order. An identification of the first traversal order is stored. A region of requested node output data is identified for each of the nodes using the region of interest data, and the graph is traversed in a second traversal order. The second traversal order is based at least in part on the stored identification of the first traversal order.

27 Claims, 7 Drawing Sheets

REGION REASONING FOR IMAGE PROCESSING GRAPHS

BACKGROUND

The present disclosure relates to image processing. In some processing workflows, images can be processed to generate an output image by applying one or more image processing operations to an input image. For example, the image processing operations may implement filtering techniques, color-space manipulations, geometric transformations (e.g., translation, reflection, rotation, scaling, etc.), other types of transformations (e.g., affine transformations, Fourier transformations, etc.), mathematical operations (e.g., addition, subtraction, convolution, etc.), mappings, and/or other techniques. In some cases, multiple image processing operations are combined to form an aggregate image processing operation. As an example of an aggregate image processing operation, a multi-dimensional image processing operation, such a two-dimensional blur, includes multiple one-dimensional operations (e.g., horizontal blur, vertical blur, etc.).

SUMMARY

This specification describes technologies relating to image processing.

In general, one aspect of the subject matter described in this specification can be embodied in a method that includes identifying an image processing graph adapted for generating an output image based on an input image. The image processing graph includes multiple nodes that each correspond to an image processing operation. Input image data relating to a particular input image and region of interest data defining an output image region to be generated based on at least a portion of the input image data are received. A domain of defined node output data is identified for each of the nodes using the input image data, and the graph is traversed in a first traversal order. An identification of the first traversal order is stored. A region of requested node output data is identified for each of the nodes using the region of interest data, and the graph is traversed in a second traversal order. The second traversal order is based at least in part on the stored identification of the first traversal order. Other embodiments of this aspect include corresponding systems, apparatus, and computer program products.

These and other embodiments can optionally include one or more of the following features. The second traversal order includes the reverse order of the first traversal order. The first traversal order is based on a depth-first-search post-order traversal of the graph. The graph includes, among the multiple nodes, a first node corresponding to a first image processing operation. Identifying a domain of defined node output data for the first node includes receiving a domain of defined node input data for the first node and applying the first image processing operation to the received domain of defined node input data for the first node. The first node can have a child node. Identifying a region of requested node output data for the child node includes identifying a region of requested node input data for the first node. The region of requested node input data for the first node is identified by applying the first image processing operation to a region of requested node output data for the first node. The region of requested node output data for each of the multiple nodes corresponds to a region of image data potentially needed from the node to enable the image processing graph to generate an output image corresponding to the output image region. The domain of defined node output data for each of the multiple nodes corresponds to a region of image data potentially produced at each node based on the input image data. A result region is determined for each of the multiple nodes. The result region for a node is based on the domain of defined node output data for the node and the region of requested node output data for the node. The result region for a node includes an intersection between the domain of defined node output data for the node and the region of requested node output data for the node. The particular input image is processed based on the image processing graph and the result region for each of the multiple nodes. Node output data is generated for the result region for each of the multiple nodes. The graph includes, among the multiple nodes, input nodes and an output node. The input image data includes a domain of defined image data for the particular image, and a domain of defined node output data is identified for each of the multiple nodes in a first traversal order by propagating the domain of defined image data for the particular image from each of the input nodes to the output node. The image processing graph is a directed acyclic graph, which can be a tree or another type of directed acyclic graph. One or more of the multiple nodes is adapted to generate node output data for use by more than one other node. One or more nodes of the graph may correspond to an affine transformation, a convolution, a Fourier transformation, a blur operation, a stretch operation, a skew operation, a rotate operation, a translate operation, and/or an image warp operation. The identification of the first traversal order is stored, for example, using a stack data structure. The second traversal order is determined based on a last-in-first-out retrieval of data from the stack data structure. In some cases, a region of requested node output data is identified for one or more nodes that are configured to generate node output data for use by multiple other nodes. The input image data identifies a domain of defined image data by a first set of pixel coordinates, and the region of interest data identifies a region of interest by a second set of pixel coordinates. The domain of defined image data and/or the region of interest includes a rectangular geometry. For example, the domain of defined image data and the region of interest can be rectangular areas. Traversing the graph in the first traversal order includes determining the domain of defined image data for a particular node by performing operations associated with at least one preceding node in the first traversal order. Traversing the graph in the second traversal order includes determining the region of requested node output data for the particular node based on operations associated with at least one preceding node in the second traversal order. Input image data is propagated by determining if a domain of defined node output data has been calculated for all child nodes of a current node and by calculating a domain of defined node output data for the current node. The domain of defined node output data is propagated through all nodes in the graph in the first traversal order. For a given node, using its image processing operation, the domain of defined node output data is computed based at least in part on the domains of defined node output data of all child nodes of the given node. Region of interest data is propagated by identifying a next node in the second traversal order and by calculating a region of requested node output data for the next node. Graph output image data is generated and displayed. The graph output image data relates to a result of using the image processing graph to process the particular input image.

Particular embodiments of the subject matter described in this specification can be implemented to realize one or more of the following advantages. The described subject matter may reduce complexity and/or improve efficiency of image processing. Image processing parameters (e.g., region of interest data and/or other data) can be propagated to the nodes of an image processing graph in a second (or subsequent) traversal of a graph without the need to implement a breadth-first search of the graph and without the need to mark or un-mark the nodes as the nodes are visited. Image processing parameters can be identified for each node of an image processing graph, including a directed acyclic graph having nodes with multiple parents. The described subject matter may provide a defined, unambiguous procedure for correctly determining an order of node traversal when calculating regions of requested node output data for graphs that include nodes having multiple parents.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An aggregate image processing operation can be represented as a directed acyclic graph, where each node in the graph corresponds to one of the composite image processing operations. An example of a directed acyclic graph is a tree, where each node in the tree (except the "leaf" nodes, at the bottom of the tree) has a "child" node from which it receives node input data, and each node in the tree (except the "root" node, at the top of the tree) has a "parent" node to which it provides node output data. Each node generates node output data by applying the node's corresponding image processing operation to node input data. The "leaf" nodes obtain node input data from a source input image. The "root" node generates an overall output image that represents the result of the aggregate image processing operation applied to the source input image.

Each node produces node output data for an image region. In some cases, the efficiency of image processing is improved by calculating only node output data for regions that affect the overall output image. For example, a region of node output data that affects the overall output image can be identified for each node, and the calculation at each node can be restricted to producing node output data for the identified region. In the example, by only calculating node output data for the identified regions, the efficiency of image processing may be improved, for example by consuming fewer computational resources, such as processor time, memory, and/or others.

Figure 1:
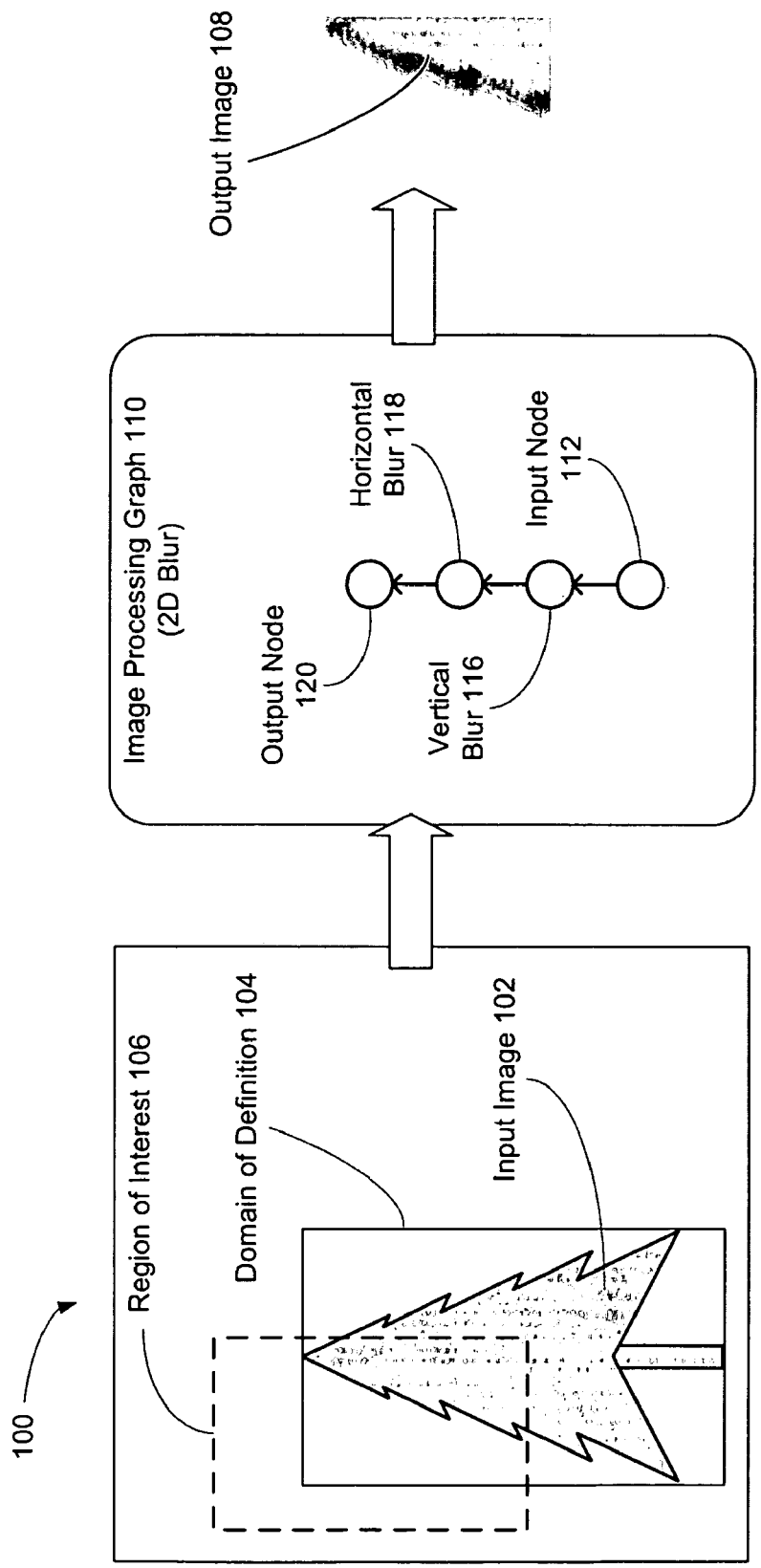
FIG. 1 is a flow chart illustrating an example implementation of image processing.

FIG. 1 is a block diagram illustrating an example process 100 for implementing image processing using an image processing graph. An image processing graph 110 is applied to all or part of an input image 102 to generate an output image 108. In the illustrated example, the image processing graph 110 applies a two-dimensional blur operation. The input image 102 is defined by image data in a domain of definition 104 (e.g., a region for which image data is defined). The domain of definition 104 can be initialized to the extent of the input image 102. Based on the domain of definition 104, a domain of defined node output data is calculated for each node of the graph 110. The domain of defined node output data represents the area for which node output data can potentially be generated by a node based on the particular domain of definition 104. Processed image data (i.e., image data processed according to the graph 110) are requested for a region of interest 106. Based on the region of interest 106, a region of requested node output data is calculated for each node of the graph 110. The region of requested node output data represents the area for which node output data will potentially be needed to generate output image data in the region of interest 106. The domain of defined node output data is calculated for each node in a first traversal of the graph 110. An identification of the order in which the nodes are visited in the first traversal is stored in a memory (e.g., a machine-readable medium). The order that the nodes are visited in the first traversal may be determined, for example, by a depth-first search post-order traversal of the graph 110. A region of requested node output data is calculated for each node in a second traversal of the graph 110. The order in which the nodes are traversed in the second traversal is based on the stored identification of the order of the first traversal. For example, the order of the second traversal is the inverse of the order of the first traversal.

Figure 4:
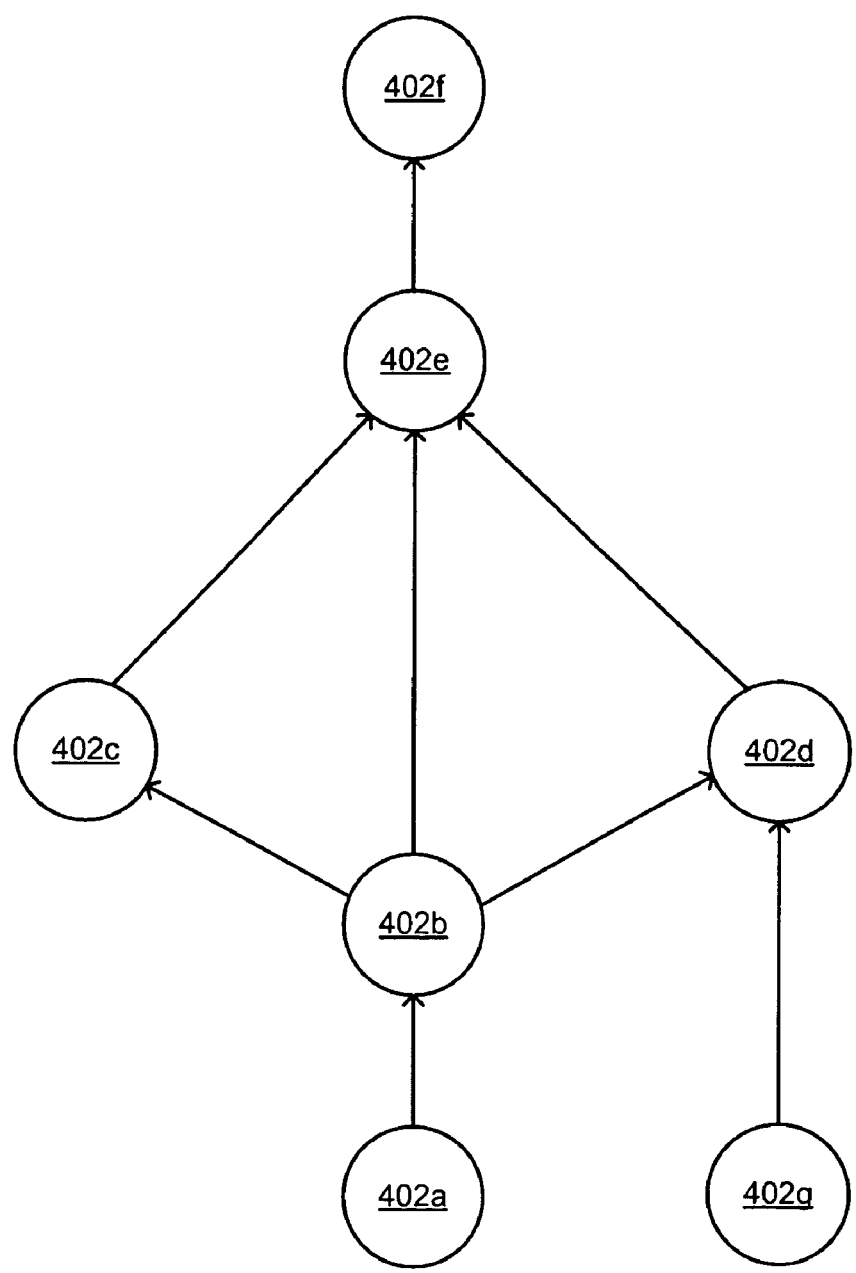
FIG. 4 is a block diagram illustrating an example image processing graph.

Storing an identification of the order of the first traversal of an image processing graph and performing the second traversal of the image processing graph in an order based on the stored identification may simplify the second traversal. For example, the second traversal may be performed without knowledge or usage of the topology of the graph 110. For example, the second traversal may be performed without implementing a breadth-first search, a depth-first search, or another type of search of the graph 110 to determine a second traversal order of the graph 110. In some cases, traversing an image processing graph requires marking (or "coloring") and/or un-marking (or "uncoloring") nodes that have been visited and identifying whether a node is marked or unmarked. By performing the second traversal in an order based on the order of a previous traversal of the graph, the need to mark (or "color") the nodes during the second traversal is avoided or reduced. In some image processing graphs, a node has more than one parent node. An example of one such case is illustrated in FIG. 4. In such cases, performing the second traversal in the reverse order of a depth-first search post-order traversal can provide a well-defined, unambiguous procedure for correctly determining an order of node traversal when calculating regions of requested node output data for nodes having multiple parents.

The input image 102 can include any type of image file formats or electronic document formats. Example formats include Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), Extended Dynamic Range Image File Format (Open- EXR, developed by Industrial Light and Magic of San Francisco, Calif.), and others. The input image 102 can represent various color spaces. Example color spaces include sRGB, CMYK, Adobe RGB, CIE LAB, and others. The input image 102 can include vector objects. A vector object can include object data and object attributes (e.g., stroke, fill color, texture, etc.). The input image 102 can include an array of pixels, such as a Cartesian or rectangular array of pixels. Each pixel can include one or more values that define a color (e.g., using any of the color space representations mentioned above and/or others) or grayscale value of the pixel. An input image may have more than two dimensions. For example, an input image may include a three-dimensional array of pixels, or a one-dimensional array of two-dimensional images. In some cases, an image processing graph can be applied to the three-dimensional image as a whole and/or to components of the three-dimensional image (e.g., each individual two-dimensional image and/or different components).

When the image processing graph 110 is implemented, input image data and region of interest data may be provided. The input image data can include, for example, the input image 102 and/or the domain of definition 104. The region of interest data can define an output image region to be generated based on at least a portion of the input image data. For example, the region of interest data can specify the region of interest 106. All or part of the input image data and region of interest data may be obtained, for example, from a user interface, from a communication interface, from a location in memory, from a software application, and/or from another source.

The domain of definition 104 can define a region for which image input data are defined. The illustrated domain of definition 104 is a rectangle, but a domain of definition can be any geometric shape. For example, a'domain of definition can be represented by a set of arbitrarily shaped areas in a two-dimensional plane. A domain of definition 104 can be expressed using different types of representations. A domain of definition 104 can be expressed as two sets of pixel coordinates. For example, the first set of pixel coordinates can specify the upper left corner of the domain of definition 104, and the second set of pixel coordinates can specify the lower right corner of the domain of definition 104. A domain of definition can be expressed as a position and size. For example, the position can specify a set of pixel coordinates for one of the corners (e.g. the upper left corner) of the domain of definition 104, and the size can specify a height and/or width of the domain of definition 104. The height, width, and/or coordinates can be expressed in units of pixels, inches, centimeters, another unit, and/or combinations. Other techniques for defining the simple or complex boundaries for a domain of definition can also be used.

The region of interest 106 can define a region for which output image data are requested from the graph 110. A region of interest 106 can be expressed using different types of representations. A region of interest 106 can be represented using any of the techniques described above for representing domain of definition 104. Moreover, a domain of node input data, a domain of node output data, a region of requested node input data, and/or a region of requested node output data can be represented using any of the techniques described above for representing domain of definition 104.

Image processing graph 110 includes multiple nodes: an input node 112, a vertical blur node 116, a horizontal blur node 118, and an output node 120. An image processing graph may include any number of nodes (e.g., two nodes, ten nodes, one hundred nodes, or a different number of nodes). Each node in the graph 110 corresponds to an image processing operation. An image processing operation can include any type of image processing operation. Examples of known image processing operations include affine transformations, convolution, Fourier transformation, a blur operation, a blend operation, a stretch operation, a skew operation, a rotate operation, a translate operation, an image warp operation, filtering operations, color-space manipulations (e.g., to adjust color content, contrast, brightness, hue, saturation, and/or another parameter), geometric transformations, linear transformations, mathematical operations (e.g., addition, subtraction, convolution, etc.), mappings, text manipulations, and other types of operations.

An image processing graph may be any type of directed acyclic graph (DAG) having one or more input nodes and one or more output nodes. Generally, the nodes in a DAG may have zero, one, or multiple (e.g., two or more) child nodes, and the nodes may have zero, one, or multiple (e.g., two or more) parent nodes. The illustrated example image processing graph 110 is an example of a tree, which is a special case of a DAG, where each node has zero or more child nodes and exactly zero or one parent node. In a tree, no node has more than one parent node. An example image processing graph 400 of FIG. 4 includes a node (402*b*) that has multiple parent nodes. Thus, the example graph 400 is not a tree. The image processing graph 100 (and/or any of the described example image processing graphs) can represent a portion of a larger image processing graph.

The described and illustrated techniques may simplify implementation and/or improve efficiency of implementation for any type of image processing graph, including trees as well as image processing graphs that include nodes with multiple parent nodes. When a particular node has multiple parent nodes, the node may be said to have multiple consumers, since the node output data produced by the particular node are received (or consumed) as node input data by each of the multiple parent nodes. Image processing graphs that include nodes with multiple parents are used in various image processing applications. In an example, an image processing graph for generating a drop shadow may include one or more nodes having multiple parent nodes. A drop shadow operation projects a shadow of an image object on a background in the image, giving the impression that the image object is raised above the background of the image. For example, a drop shadow for a simple rectangular object can be created by drawing a grayscale replica of the object, which is blurred, offset from, and then overlayed with the original object. Many interesting and useful image processing operations can be expressed with an image processing graph that includes one or more nodes with multiple parent nodes.

Each node in the graph 110 (except the input node 112) has a "child" node from which it receives node input data when the graph 110 is executed, and each node in the graph 110 (except the output node 120) has a "parent" node to which it provides node output data when the graph 110 is executed. Each node generates node output data by applying the node's corresponding image processing operation to the node input data. The input node 112 obtains input image data from the input image 102. The input node 112 corresponds to the identity operation, which means that the node input data are identical to the node output data for the input node 112. The output node 120 generates output image data that represent the result of applying the image processing graph 110. In the example, the node output data of the output node 120 include the output image 108, which is the result of applying the two-dimensional blur graph (an aggregate of two one-dimensional blur operations) to a portion of the input image 102. The output node 120 corresponds to the identity operation, which means that the node input data are identical to the node output data for the output node 120. For example, the node output data for the output node 120 can be the node output data from node 118.

The node output data of the input node 112 are received as node input data by the vertical blur node 116. The vertical blur node 116 corresponds to a vertical blur operation (e.g., with a blur radius of four, five, ten, or a different number of pixels). The node output data of the vertical blur node 116 are received as node input data by the horizontal blur node 118. The horizontal blur node 118 corresponds to a horizontal blur operation (e.g., with a blur radius of four, five, ten, or a different number of pixels). The node output data from the horizontal blur node 118 are received as node input data by the output node 120. In some cases, the order of the vertical blur node 116 and the horizontal blur node 118 in the graph 110 may be switched.

Another example image processing graph blends two input images. In this example, the graph includes four nodes: two input nodes, a blend node, and an output node. The two input nodes each receive an input image. The two input nodes may receive distinct images or different portions of the same image. Both input nodes are child nodes of the blend node, and thus, the input nodes both provide their node output data to the blend node. The blend node combines the data received from the two input nodes, and provides the combined data to the output node. Another example image processing graph adjusts the contrast and brightness of an input image. In this example, the graph includes two input nodes, a contrast node, a brightness node, a blend node, and an output node. In this example, the two input nodes receive the same input image data. One of the input nodes is the child node of the brightness node and the other input node is the child node of the contrast node. The contrast node adjusts the contrast of node input data received from an input node and provides node output data to the blend node. The brightness node adjusts the brightness of node input data received from an input node and provides node output data to the blend node. The blend node combines the data received from the brightness and contrast nodes, and provides the combined data to the output node.

In order to determine an appropriate region of the image to calculate at each node, the domain of definition 104 and the region of interest 106 are propagated to each node in the graph 110. For example, in some cases, a reduced or minimum area of the image that needs to be calculated at each node is determined in order to avoid unnecessary calculations when implementing the graph 110. This is accomplished by propagating the domain of definition 104 to each node of the graph 110 from each of the input nodes 112 to the output node 120. Propagating the domain of definition 104 to each node in the graph 110 includes determining a domain of defined node output data for each node based on the domain of definition 104. The domain of definition is propagated by traversing the graph 110. For example, the nodes may be traversed in a first traversal order based on a depth-first search post-order traversal of the graph. An identification of the first order in which the nodes are traversed can be stored, for example, in memory (RAM, ROM, and/or another type of memory). Next, the region of interest 106 is propagated to each node of the graph 110 from the output node 120 to each of the input nodes 112. Propagating the region of interest 106 includes determining a region of requested node output data for each node based on the region of interest 106. The region of interest 106 is propagated by traversing the graph 110 in a second order, and the second order can be determined based on the stored identification of the first order. For example, the second order can be the inverse (i.e., reverse) of the first order. A specific example of propagating a domain of definition and a region of interest through an image processing graph is described in FIG. 3. An example process for propagating a domain of definition through an image processing graph is described in FIG. 5B. An example process for propagating a region of interest through an image processing graph is described in FIG. 5C.

Figure 2:
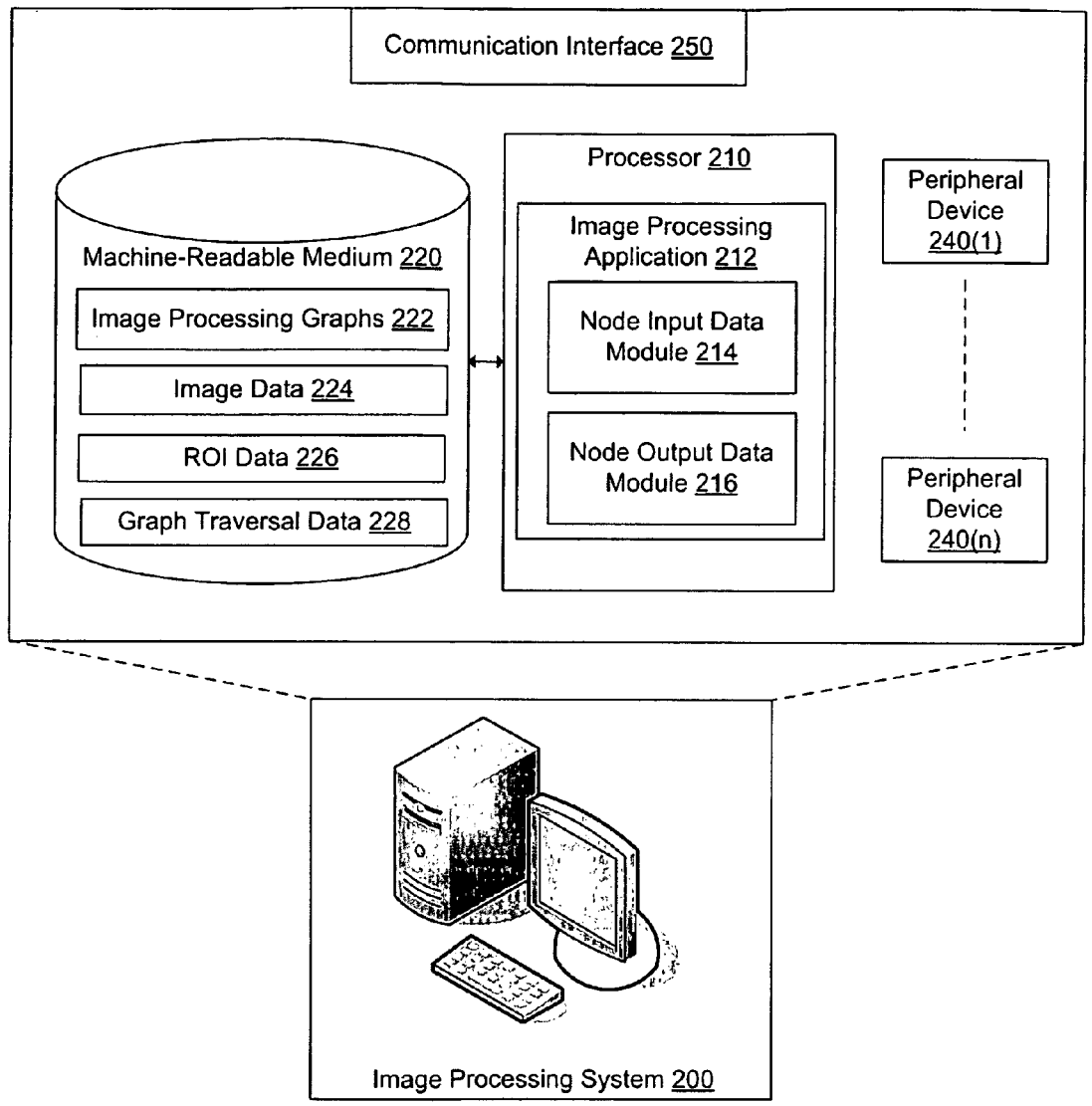
FIG. 2 is a block diagram illustrating an example image processing system.

FIG. 2 is a block diagram illustrating an example image processing system 200. The image processing system 200 can implement image processing using an image processing graph. The image processing system 200 includes one or more processors 210. The one or more processors 210 execute instructions included in an image processing application 212. The image processing application 212 can include visual effects software (e.g., Adobe® After Effects® software, available from Adobe Systems Incorporated of San Jose, Calif.), image editing software (e.g., Adobe® Photoshop® software, available from Adobe Systems 25 Incorporated of San Jose, Calif.), and/or video editing software (e.g., Adobe ® Premiere® software, available from Adobe Systems Incorporated of San Jose, Calif.). Thus, the image processing application 212 can operate on digital images from many different sources.

The image processing system 200 includes at least one computer-readable medium 220. The computer-readable medium 220 can include a random access memory (RAM), a program memory (for example, a writable read-only memory (ROM) such as a flash ROM), a hard drive, and a removable disk drive (e.g., a floppy disk, compact disk (CD), or digital versatile disk (DVD) drive). All such computer readable media can be suitable for storing executable or interpretable computer programs, including programs embodying aspects of the subject matter described in this specification. In addition, the image processing system 200 can include a hard drive controller, a video controller, and an input/output (VO) controller coupled by a system bus. The apparatus 210 can be preprogrammed, in ROM, for example, or it can be programmed (and reprogrammed) by loading a program from another source (for example, from a floppy disk, a CD-ROM, DVD, or another computer).

As illustrated, the computer-readable medium 220 can store data including image processing graphs 222, image data 224, region of interest data 226, graph traversal data 228, and/or other data. An image processing graph 222 can include a number of nodes corresponding to image processing operations. For example, the image processing graphs 222 can include the image processing graph 110 or FIG. 1, the image processing graph 300 of FIG. 3, the image processing graph 400 of FIG. 4, and/or others. The image data 224 can include input images (e.g. input image 102 of FIG. 1, and/or others), domains of definition for the input images (e.g., domain of definition 104 of FIG. 1, domain of definition 104a of FIG. 3, and/or others), output images (e.g. output image 108 of FIG. 1, and/or others), domains of defined node output data (e.g., domain 104b of FIG. 3, and/or others), and other image data. A digital image (which for brevity will simply be referred to as an image or image data) does not necessarily correspond to a file. An image may be stored in a portion of a file that holds other images, in a single file dedicated to the image in question, or in multiple coordinated files. In addition, as used herein, an image can include multiple images; thus, "an image" includes video imagery in addition to still images.

The region of interest data 226 can include a region of interest (e.g., region of interest 106 of FIG. 1, region of interest 106a of FIG. 3, and/or others), regions of requested node output data (e.g., 106b of FIG. 3, and/or others), and/or other region of interest data. Graph traversal data 228 can include data stored during or after the traversal of an image processing graph. Graph traversal data can include an order in which nodes have been or will be traversed. Graph traversal data can include an order in which nodes have been or will be traversed when determining domains of defined node output data for the nodes. Graph traversal data can include an order in which nodes have been or will be traversed when determining regions of requested node output data for the nodes. A traversal order can include a traversal order based on a depth-first search post-order traversal of a graph, which may include an inverse, a substantial inverse, or another variation of a traversal order based on a depth-first search post-order traversal of a graph.

The image processing system 200 can also include one or more input/output (I/O) interface devices, such as a communication interface 250, one or more peripheral devices 240(1) through 240(n), which may include user interface devices and one or more additional devices. The I/O interface devices can be coupled with one or more I/O controllers in the system 200 through one or more I/O buses, and the I/O interface devices can receive and transmit data (e.g., stills, pictures, movies, and animations 20 for importing into a composition) in analog or digital form over communication links such as a serial link, local area network, wireless link, and parallel link. The peripheral device(s) 240 can include display screen(s), keyboard(s) (e.g., a custom video editing keyboard), mouse, stylus, or any combination thereof. Moreover, the image processing system 200 can itself be considered a user interface device (e.g., when the image processing application 212 is delivered as a Web service).

The peripheral device(s) 240 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium. The image processing system 200 is operable to implement image processing using an image processing graph.

Figure 3:
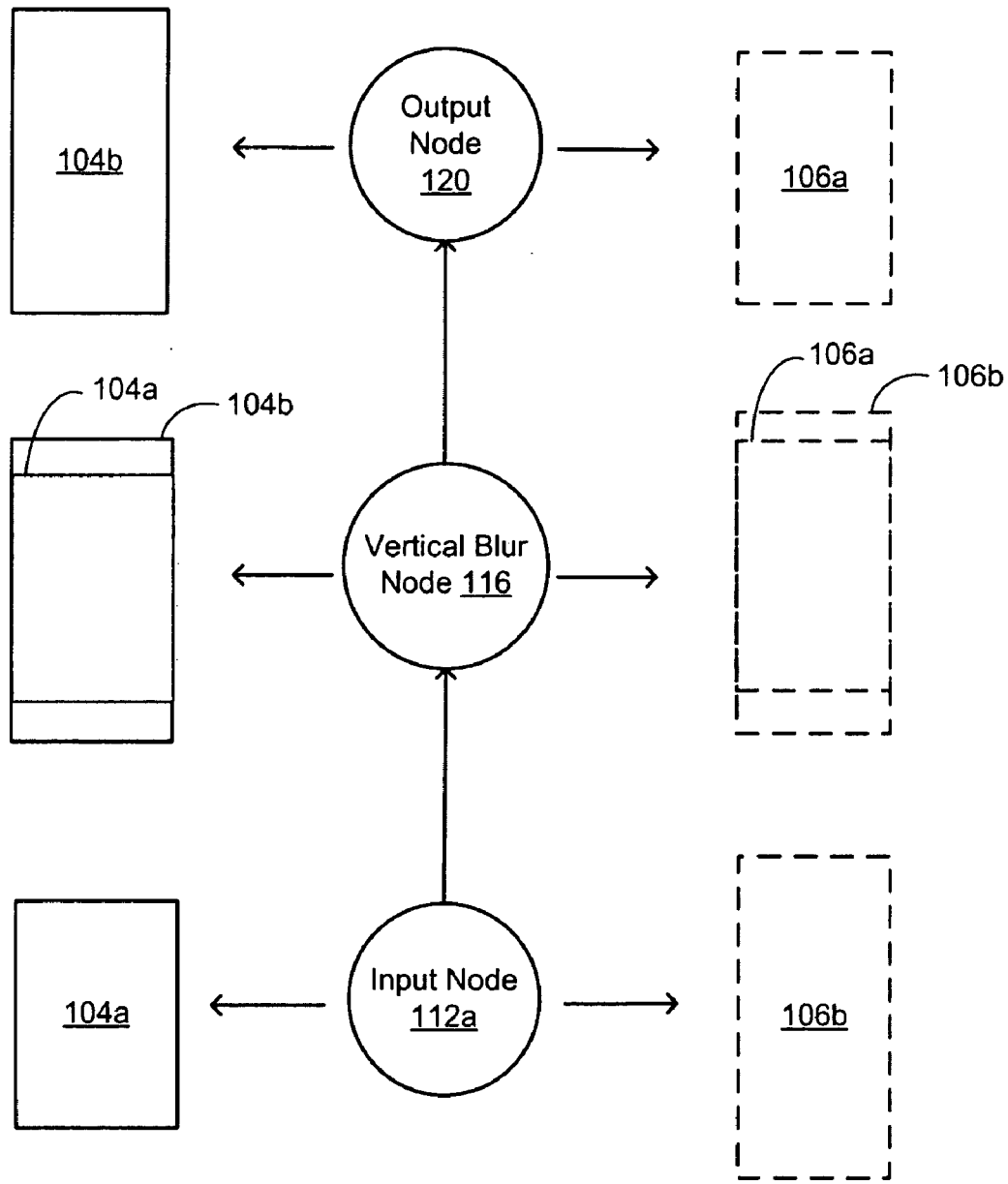
FIG. 3 is a block diagram illustrating an example of propagating data to nodes of an image processing graph.

FIG. 3 is a block diagram illustrating an example image processing graph 300. The illustrated example graph 300 applies a one-dimensional blur image processing operation to an input image to generate an output image. The example graph 300 includes three of the nodes from FIG. 1: the input node 112a, the vertical blur node 116, and the output node 120. FIG. 3 includes an illustration of propagating image input data to each node in the graph 300 and an illustration of propagating region of interest data to each node in the graph 300.

In the illustrated example, propagating image input data to each node in the graph 300 includes identifying a domain of defined node output data for each node in the graph 300, traversing the graph 300 in a first traversal order. The first traversal order begins with the input node 112a. The input node 112a is succeeded in the first traversal order by the vertical blur node 116, and the first traversal order ends with the output node 120. The first traversal order can be determined based on a depth-first search post-traversal of the graph 300. An identification of the first traversal order can be stored, for example, in a machine-readable medium. In some implementations, the first and/or the second traversal of the graph 300 is completed before generating node output data at any'node. For example, a domain of defined node input data, a domain of defined node output data, a region of requested node input data, a region of requested node output data, a result region, and or other information may be identified for any and/or all nodes before node output data is calculated at any of the nodes. In some implementations, node output data is calculated for one or more nodes before the second traversal of the graph 300 and after the first traversal of the graph 300. In some implementations, node output data is only calculated after the first and the second traversals of the graph 300.

In the first traversal of the graph 300, the input node 112a obtains image input data that includes a domain of definition 104a. The example domain of definition 104a is a rectangle specified by the pixel coordinates of two diagonally opposite corners of the rectangle. For example, the rectangle may be specified by the pixel coordinates (2, 2) and (8, 10), which means that the four corners of the rectangle have coordinates (2, 2), (2, 10), (8, 10), and (8, 2). In described examples, the first coordinate specifies a horizontal position in a pixel array, and the second coordinate specifies a vertical position in the pixel array. Other pixel coordinate and/or pixel array formats may be used. The domain of defined node output data for a node can be calculated by applying the corresponding image processing operation to the domain of defined node input data for the node. The input node 112a corresponds to the identity operation. Thus, the domain of defined node output data for the input node 112a is identical to the domain of defined node input data for the input node 112a. The domain of defined node input data for the node 112a and the domain of defined node output data for the node 112a are both equal to the domain of definition 104a.

Proceeding with the first traversal of the graph 300, the vertical blur node 116 obtains a domain of defined node input data for the node 116. The domain of defined node input data for the node 116 is the domain of defined node output data for its child node, the input node 112a. Thus, in the illustrated example, the domain of defined node input data for the node 116 is the domain of definition 104a. The vertical blur node 116 corresponds to a vertical blur operation. A vertical blur operation can have a blur radius parameter that specifies a range of pixels over which image data is blurred in a vertical direction. (Similarly, a horizontal blur operation can have a blur radius parameter that specifies a range of pixels over which image data is blurred in a horizontal direction.) Applying a blur operation to a pixel (or a group of pixels) can include applying a convolution operation to and/or averaging image data from the pixels (or group of pixels) and adjacent pixels within a certain blur radius of the pixels (or group of pixels). Thus, the vertical blur operation can effectively expand an area in which image data is defined, generating node output image data having a larger area than the node input image data. Accordingly, the domain of defined node output data for the vertical blur node 116 is larger than the domain of defined node input data for the blur node 116 (assuming a non-zero blur radius). The domain of defined node output data for the vertical blur node 116 is the domain 104b. The domain 104b has a vertical dimension that is larger than the domain 104a by twice the blur radius. For example, if the blur radius is four pixels and the domain 104a is specified by the coordinates (2, 2) and (8, 10), the domain 104b is specified by the coordinates (2, −2) and (8, 14).

Completing the first traversal of the graph 300, the output node 120 obtains a domain of defined node input data for the node 120. The domain of defined node input data for the node 120 is the domain of defined node output data for its child node, the vertical blur node 116. Thus, the domain of defined node input data for the node 120 is the domain 104b. The output node 120 corresponds to the identity operation. Thus, the domain of defined node output data for the output node 120 is identical to the domain of defined node input data for the output node 120. The domain of defined node input data for the node 120 and the domain of defined node output data for the node 120 are both equal to the domain 104b.

In the illustrated example, propagating region of interest data to each node in the graph 300 includes identifying a region of requested node output data for each node in the graph 300, traversing the graph 300 in a second traversal order. The second traversal order is the inverse of the first traversal order. The second traversal order begins with the output node 120, which is succeeded by the vertical blur node 116, and the second traversal order ends with the input node 112a. The second traversal order can be determined based on the first traversal order. For example, the stored identification of the first traversal order can include a stack data structure, and the second traversal can be determined by reading the stack in a last-in-first-out manner.

In the second traversal of the example graph 300, the output node 120 obtains region of interest data that includes a region of interest 106a. The example region of interest 106a is a rectangle specified by the pixel coordinates of two diagonally opposite corners of the rectangle. For example, the rectangle may be specified by the pixel coordinates (4, 4) and (10, 12). The region of requested node output data of the output node 120 is the region of interest 106a. The region of requested node input data for the output node 120 is identified. Identifying a region of requested node input data for a given node can include applying the corresponding image processing operation to a region of requested node output data for the given node. The output node 120 corresponds to the identity operation. Thus, the region of requested node input data for the output node 120 is identical to the region of requested node output data for the output node 120. The region of requested node input data for the node 120 and the region of requested node output data for the node 120 are both equal to the region of interest 106a.

Proceeding with the second traversal of the graph 300, the vertical blur node 116 obtains a region of requested node output data for the node 116. In some cases, identifying a region of requested node output data for a given node can include identifying a region of requested node input data for a parent node of the given node. In some cases, identifying a region of requested node output data for a given node can include identifying a region of requested node input data for multiple parent nodes of the given node. The region of requested node output data for the node 116 is the region of requested node input data for its parent node, the output node 120. Thus, the region of requested node output data for the node 116 is the region of interest 106a. Next, the region of requested node input data for the node 116 is identified by applying the corresponding image processing operation to the region of requested node output data for the node 116. The vertical blur node 116 corresponds to a vertical blur operation, and the region of requested node input data for the vertical blur node 116 is the region 106b. The region 106b has a vertical dimension that is larger than the region 106a by twice the blur radius. For example, if the blur radius is four pixels and the domain 106a is specified by the coordinates (4, 4) and (10, 12), the region 106b is specified by the coordinates (4, 0) and (10, 16).

Completing the second traversal of the graph 300, the input node 112a obtains a region of requested node output data for the node 120. The region of requested node output data for the node 112a is the region of requested node input data for its parent node, the vertical blur node 116. Thus, the region of requested node output data for the node 112a is the domain 106b. The input node 112a corresponds to the identity operation. Thus, the region of requested node input data for the input node 112a is identical to the region of requested node output data for the input node 112a. The region of requested node input data for the node 112a and the region of requested node output data for the node 112a are both equal to the region 106b.

A result region for each node in the example graph 300 may also be calculated. The result region for a given node can be identified based on the domain of defined node output data and the region of requested node output data for the given node. For example, the result region can be the intersection of the domain of defined node output data and the region of requested node output data for the given node. Continuing the example, a domain of defined node output data for the node 116 is specified by the coordinates (2, −2) and (8, 14), a region of requested node output data for the node 116 is specified by the coordinates (4, 0) and (10, 16), and the result region of the node 116 is the intersection, specified by the coordinates (4, 0) and (8, 14). Result regions may also be calculated for the nodes 112a and/or 120. In some cases, the result region of a node identifies a reduced or minimum image area for which node output data generated by the node affects the output image generated by the graph. In some cases, the result region for a node is smaller than either the domain of defined node output data or the region of requested node output data for the node. In some cases, the result region is further modified. For example, there may be cases where the result region is dilated, contracted, or otherwise transformed after the result region is initially calculated. The result region for a node can represent the image area for which the node calculates node output data when the graph is implemented.

FIG. 4 is a block diagram illustrating an example image processing graph 400. The example image processing graph 400 includes seven nodes (collectively, "nodes 402"). Input (or "leaf") nodes 402a and 402g receive input image data relating to a particular input image. An output (or "root") node 402f generates output image data that represent the result of applying the image processing graph 400 to the particular input image. Nodes 402b, 402c, 402d, and 402e each receive node input data from one or more child nodes and apply an image processing operation to the node input data to generate node output data. Node 402b receives node input data from node 402a. Node 402d receives node input data from node 402g. Node 402c receives node input data from node 402b. Node 402e receives node input data from nodes 402c, 402b, and 402d. Node 402f receives node input data from node 402e.

When propagating domain of definition data to each of the nodes 402, the graph 400 is traversed by traversing the nodes in a first order. An example algorithm for propagating domain of definition data to the nodes of a graph is provided in FIG. 5B. The first order may be based on a depth-first search post-order traversal of the graph 400. Before the first traversal, the domain of defined node output data for one or more of the nodes 402 may be undefined, uninitialized, undetermined, or otherwise unknown. Each node may be marked or "colored" to indicate that the domain of defined node output data has not been identified for the node. During the first traversal, when the domain of defined node output data is identified for a node, the node may be marked or "colored" differently to indicate that the domain of defined node output data has been identified for the node. During or after the first traversal, the first order (and/or an identification of the first order) in which the nodes are traversed in the first traversal can be stored, for example, in memory. The first traversal order can be stored as a linked list, a stack, a queue, or another type of data structure.

In an example first traversal of the graph 400, the nodes are traversed in the following order: 402g, 402a, 402b, 402d, 402c, 402e, 402f. In this example, the first traversal proceeds as follows. First, the node 402g is identified as the current node. The node 402g has no child node for which a domain of defined node output data has not been identified (node 402g has no child node). A domain of defined node output data is identified for the current node 402g, for example, based on a domain of definition for a particular input image. Current node 402g has a parent node 402d. The parent node 402d is identified as the new current node. The current node 402d has a child node 402b for which a domain of defined node output data has not been identified. Node 402b is identified as the new current node. The current node 402b has a child node 402a for which a domain of defined node output data has not been identified. Node 402a is identified as the current node. Node 402a has no child node for which a domain of defined node output data has not been identified (node 402a has no child node). A domain of defined node output data is identified for the current node 402a. Current node 402a has a parent node 402b. The parent node 402b is identified as the new current node. The current node 402b has no child node for which a domain of defined node output data has not been identified (since a domain of defined node output data has been identified for child node 402a). A domain of defined node output data is identified for node 402b. Node 402b has three parent nodes 402c, 402e, and 402d. (At this point in the traversal, any of the three parent nodes 402c, 402d, or 402e could be identified as the new current node. However, note that parent node 402e has two child nodes, 402c and 402d, for which a domain of defined node output data has not been defined.) The parent node 402d is identified as the new current node. The current node 402d has no child node for which a domain of defined node output data has not been identified. A domain of defined node output data is identified for node 402d. The current node 402d has a parent node 402e. The parent node 402e is identified as the current node. The node 402e has a child node 402c for which a domain of defined node output data has not been identified. The child node 402c is identified as the current node. The current node 402c has no child node for which a domain of defined node output data has not been identified. A domain of defined node output data is identified for node 402c. The current node 402c has a parent node 402e. The parent node 402e is identified as the current node. The current node 402e has no child node for which a domain of defined node output data has not been defined. A domain of defined node output data is identified for the current node 402e. The current node 402e has a parent node 402f. The parent node 402f is identified as the current node. The current node 402f has no child node for which a domain of defined node output data has not been defined. A domain of defined node output data is identified for the current node 402f. The current node 402f has no parent node.

The example graph 400 may be traversed in a different traversal order in the first traversal of the graph 400. In the example detailed above, a domain of defined node output data can be identified for the node 402c before the node 402d. After the domain of defined node output data is defined for node 402b, the parent node 402c had no child node for which a domain of defined node output data had not been identified. In this alternative, the first traversal order could be the following order: 402g, 402a, 402b, 402c, 402d, 402e, 402f. As an example of another alternative, the first traversal may begin with the node 402a, since, like node 402g, node 402a has no child nodes. In such a case, the nodes may be traversed in the following order: 402a, 402b, 402g, 402d, 402c, 402e, 402f; or the nodes may be traversed in the following order: 402a, 402b, 402c, 402g, 402d, 402e, 402f. In a depth-first search post-order traversal: a domain of defined node output data is identified for a node after a domain of defined node output data is identified for all of the node's child nodes.

When propagating region of interest data to each of the nodes 402, the graph 400 is traversed by traversing the nodes in a second order. An example algorithm for propagating region of interest data to the nodes of a graph is provided in FIG. 5C. The second order may be based on the first order. For example, the second order may be the reverse of the first order. For example, when the first order is 402g, 402a, 402b, 402d, 402c, 402e, 402f, the second order can be the reverse of the first order: 402f, 402e, 402c, 402d, 402b, 402a, 402g. The second order can be substantially the reverse of the first order. For example, when the first order is 402g, 402a, 402b, 402d, 402c, 402e, 402f, the second order can be substantially the reverse of the first order: 402f, 402e, 402c, 402d, 402b, 402g, 402a. In the example, the second traversal order can be the reverse or substantially the reverse of any of the example first traversal orders described above. When the second order is based on the first order, a region of requested node output data is identified for a node after a region of requested node output data is identified for all of the node's parent nodes. This can be accomplished without performing a breadth-first traversal of the graph 400.

In cases where the first traversal order (and/or an identification of the first traversal order) in which the nodes are traversed in the first traversal of the graph is stored in memory (e.g., as a stack, linked list, array, etc.), the second order can be determined by reading the nodes from memory in a last-in-first-out order. When node identifiers are stored as a stack, the first node identifier added to the stack may be at the "bottom" of the stack, and a node identifier most recently added to the stack may be at the "top" of the stack. When node identifiers are read from a stack, the node identifiers may be read in a last-in-first-out (LIFO) order. When node identifiers are read in a last-in-first-out order, the node most recently stored in the memory may be "popped" from the "top" of the stack. Thus, by storing node identifiers as a stack data structure during the first traversal and reading the stored node identifiers from the stack during the second traversal, the node identifiers may be read (during or before the second traversal) in an order that is the reverse of the order in which the node identifiers were stored (during, before, or after the first traversal).

Figure 5A:
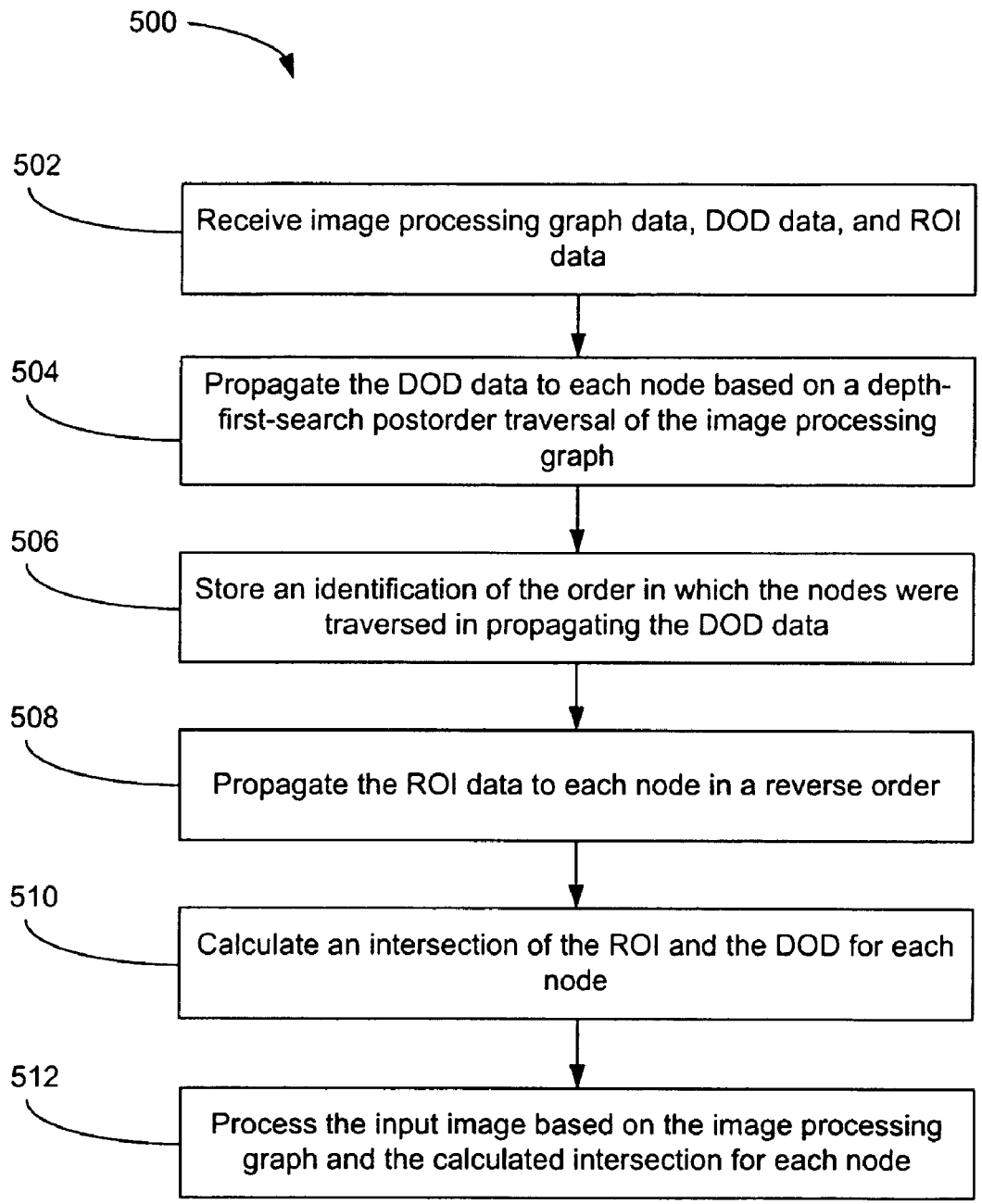
FIG. 5A is a flow chart illustrating an example process for implementing image processing using an image processing graph.

FIG. 5A is a flow chart illustrating an example process 500 for image processing. The example process 500 can be implemented by a computer running software. For example, the process 500 may be implemented based on instructions included in an image processing software application, such as an image editor, a movie editor, a multimedia editor, a drawing tool, or any other type of image processing software tool. The process 500 may include the same, additional, fewer, and/or different operations implemented in the illustrated order or a different order.

At 502, image processing data is received. For example, the data may be received through an interface, read from a machine-readable medium, loaded in to a software application, and/or received by another technique. The data includes image processing graph data, domain of definition data, and region of interest data. The image processing graph data identifies a graph that includes multiple nodes, and each node corresponds to an image processing operation. The graph is adapted to generate an output image based on an input image. The graph may be part of a larger graph. The graph may be a directed acyclic graph. The graph can represent an aggregate image processing operation, and the nodes can correspond to composite image processing operations. One or more of the nodes may have multiple parent nodes. One or more of the nodes may have multiple child nodes. One or more of the nodes may be input nodes that obtain image input data related to a particular source image. One or more of the nodes may be output nodes that generate the output image.

At 504, the domain of definition data is propagated to each node in the graph. An example algorithm for propagating domain of definition data to nodes in a graph is provided in FIG. 5B. When propagating the domain of definition data, the nodes are traversed in a first order. The first order may be determined based at least in part on a breadth-first search, a depth-first search, or another type of search performed over the graph. The first order may be determined based at least in part on a post-order, pre-order, in-order, level-order, and/or another type of traversal order. When the domain of definition data is propagated, a domain of defined node output data may be identified for each node in the graph. The graph may be traversed from one or more input nodes to one or more output nodes. When the domain of definition data is propagated, a domain of defined node output data may be identified for a node after a domain of defined output data is identified for all of the node's child nodes. The domain of definition data may be propagated based on an iterative, nested, and/or recursive function or algorithm.

At 506, an identification of the order in which the nodes were traversed in propagating the domain of definition data is stored in a machine-readable medium. The identification may include node identifiers or any other data that collectively represents or could be used to reconstruct the first traversal order. The stored traversal order may be represented as an array, a list, a linked list, a stack, a queue, or another type of data structure.

At 508, the region of interest data is propagated to each node in the graph. An example algorithm for propagating region of interest data to nodes in a graph is provided in FIG. 5C. The region of interest data may be propagated by traversing the nodes in an order that is derived from or otherwise based on the identification of the order stored in memory (at 506). For example, the region of interest data may be propagated by traversing the nodes in a reverse or substantially in the reverse of the order in which the graph was traversed when propagating the domain of definition data (at 504). When the region of interest data is propagated, a region of requested node output data may be identified for each node in the graph. The graph may be traversed from one or more output nodes to one or more input nodes. When the region of interest data is propagated, a region of requested node output data may be identified for a node after a region of requested node output data is identified for all of the node's parent nodes.

At 510, an intersection of the region of interest for each node and the domain of definition for each node is calculated. The intersection can represent a result region for which node output image data is generated by the node. The result region can be further modified based on the region of interest, the graph, the domain of definition, the particular input image, and/or other data.

At 512, the input image is processed based on the image processing graph and the calculated intersection (from 510) for each node. Processing the input image based on the image processing graph and the calculated intersection may generate an output image in an area defined by the region of interest. Processing the input image based on the image processing graph and the calculated intersection may include processing the input image based on the result region or the modified result region.

Figure 5B:
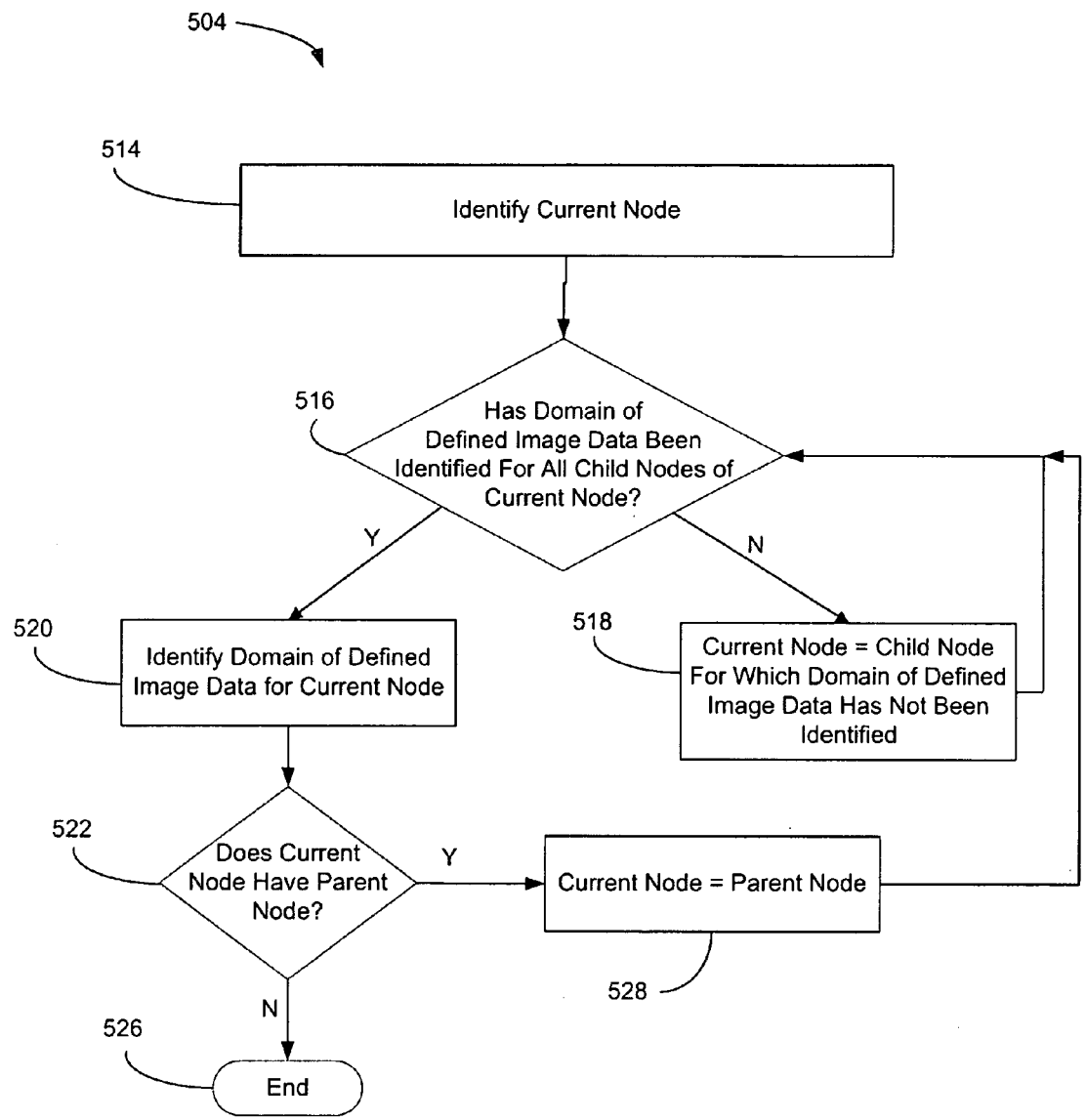
FIG. 5B is a flow chart illustrating an example process for propagating input image data to nodes of an image processing graph.

FIG. 5B is a flow chart illustrating an example process 504 for propagating image data in an image processing graph. In the example process 504, propagating image data includes identifying a domain of defined image data for nodes of an image processing graph, traversing the graph in a first traversal order. The first traversal order can be based on a depth-first search post-order traversal of the graph. The domain of defined image data for a node can be a domain of defined node output data for the node. The domain of defined image data for a node can be a region or area of image data potentially produced at the node based on the input image data. The process 504 may represent an iterative process that can be iterated until a domain of defined image data has been identified for each node of an image processing graph. The process 504 may include the same, additional, fewer, and/or different operations implemented in the illustrated order or a different order. Before and/or during implementation of the process 504, all or some of the nodes may have an uninitialized, undefined, unidentified, or otherwise unknown domain of defined image data.

At 514, a current node is identified. The current node at 514 can be an input node, an output node, or any other node in the graph. At 516, if the current node has any child nodes, the child nodes of the current node are identified in order to determine whether a domain of defined image data has been identified for all of the child nodes. If a domain of defined image data has been identified for all of the child nodes of the current node, a domain of defined image data is identified for the current node (at 520). The domain of defined image data for a given node can be identified by receiving (e.g., obtaining, loading, reading, etc.) a domain of defined node input data for the given node and applying the corresponding image processing operation to the received domain of defined node input data. In cases where the given node has multiple child nodes, the domain of defined node input data can be the intersection, union, or some other combination of the domains of defined node output data of the child nodes.

At 522, if the current node does not have a parent node, the process 504 may terminate. Alternatively at 522, if the current node does have a parent node, the current node is updated to be the parent node, and the process 504 returns to 516. At 516, if a domain of defined image data has not been identified for all of the child nodes of the current node, the current node is updated to be one of the child nodes for which a domain of defined image data has not been identified (at 518). From 518, the process returns to 516.

Figure 5C:
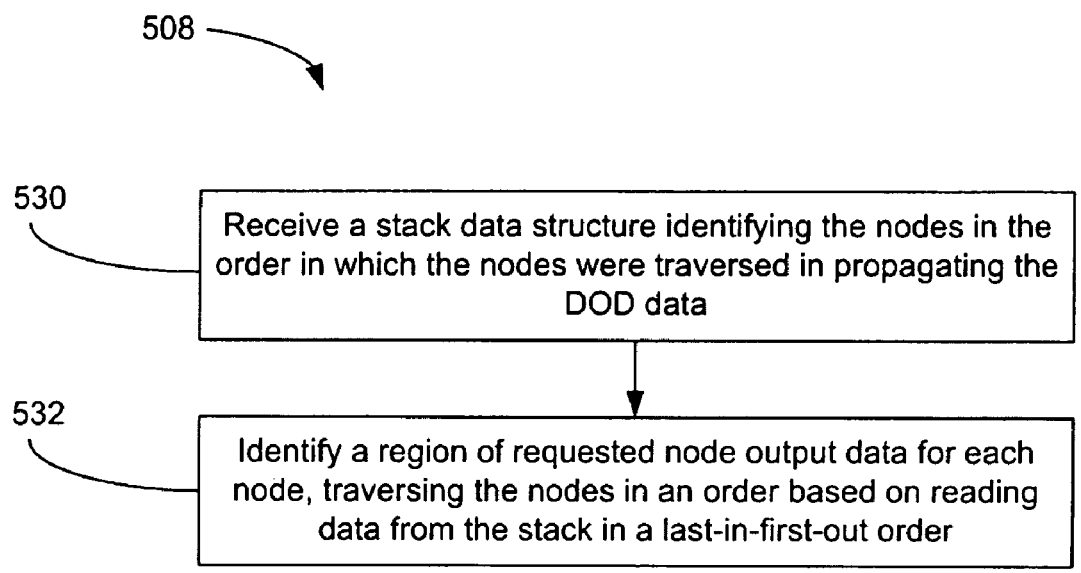
FIG. 5C is a flow chart illustrating an example process for propagating region of interest data to nodes of an image processing graph.

FIG. 5C is a flow chart illustrating an example process 508 for propagating region of interest data to nodes of an image processing graph. In the example process 508, propagating region of interest data includes identifying a region of requested image data for nodes of an image processing graph, traversing the graph in a second traversal order. The second traversal order can be based on the first traversal order that has been previously determined, for example at 504, and/or stored, for example at 506. For example, a second traversal order can be the reverse (i.e., inverse) of a first traversal order. The region of requested node output data for a node can be a region of image data potentially needed from the node (e.g., by a parent node) to enable the image processing graph to generate an output image corresponding to the output image region. The process 508 may implement iterative operations, and the operations may be iterated until a region of requested node output data has been identified for all nodes of the graph. The process 508 may include the same, additional, fewer, and/or different operations implemented in the illustrated order or a different order. Before and/or during the process

508, all or some of the nodes may have an uninitialized, undefined, unidentified or otherwise unknown region of requested node output data.

At 530, a stack data structure is received. For example, the stack data structure can be received through an interface, loaded by a software application, read from memory, and/or received in a different manner. In some implementations, all or part of the stack data structure is instantiated and/or initialized at 504 and/or 506 of the process 500 of FIG. 5A. The stack data structure identifies the nodes in the order in which the nodes were traversed in propagating the domain of definition data (at 504). At 532, a region of requested node output data is identified for each node, traversing the nodes in an order based on reading data from the stack in a last-in-first-out order. For example, the nodes (or node identifiers) may be read from the stack by "popping" the next node from the "top" of the stack. Reading the stack in a last-in-first-out order may cause the nodes to be read in the inverse (or reverse) of the order in which the nodes were written to the stack, for example, based on an earlier traversal of the graph. The region of requested node output data for a given node can be the region of requested node input node for a parent node of the given node. In some cases, where the given node has multiple parents, the region of requested node output data for the given node can be the intersection, union, or some other combination of the regions of requested node input data of the parent nodes of the given node. The region of requested node input data for a given node can be identified by applying the corresponding image processing operation to the region of requested node output data for the given node.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method for image processing, the method comprising:
identifying an image processing graph comprising a plurality of nodes, each of the plurality of nodes corresponding to an image processing operation, wherein the image processing graph is adapted for generating an output image based on an input image;
receiving input image data relating to a particular input image;
receiving region of interest data defining an output image region to be generated based on at least a portion of the input image data;
traversing the graph in a first traversal order to determine a domain of defined node output data for each of the plurality of nodes using the input image data;
storing an identification of the first traversal order, wherein the stored identification of the first traversal order identifies a first sequence of the plurality of nodes; and
traversing the graph in a second traversal order to determine a region of requested node output data for each of the plurality of nodes using the region of interest data, wherein the second traversal order includes a second sequence of the plurality of nodes, different from the first sequence, and the second traversal order is determined based at least in part on the stored identification of the first traversal order.

2. The method of claim 1, wherein the second traversal order comprises the reverse order of the first traversal order.

3. The method of claim 1, wherein the first traversal order is based on a depth-first-search post-order traversal of the graph.

4. The method of claim 1, wherein the plurality of nodes comprises a first node corresponding to a first image processing operation, and determining a domain of defined node output data for the first node comprises:
receiving a domain of defined node input data for the first node; and
applying the first image processing operation to the received domain of defined node input data for the first node.

5. The method of claim 1, wherein the plurality of nodes comprises a first node corresponding to a first image processing operation, the first node has a child node, determining a region of requested node output data for the child node comprises determining a region of requested node input data for the first node, and the region of requested node input data for the first node is identified by applying the first image processing operation to a region of requested node output data for the first node.

6. The method of claim 1, wherein the region of requested node output data for each of the plurality of nodes corresponds to a region of image data that is requested from the node to enable the image processing graph to generate an output image corresponding to the output image region.

7. The method of claim 1, wherein the domain of defined node output data for each of the plurality of nodes corresponds to a region of image data that each node is able to produce based on the input image data.

8. The method of claim 1, further comprising determining a result region for each of the plurality of nodes, wherein the result region for a node comprises an intersection between the domain of defined node output data for the node and the region of requested node output data for the node.

9. The method of claim 8, further comprising processing the particular input image based on the image processing graph and the result region for each of the plurality of nodes.

10. The method of claim 1, wherein the plurality of nodes comprises a plurality of input nodes and an output node, the input image data comprises a domain of defined image data for the particular image, and determining a domain of defined node output data for each of the plurality of nodes in a first traversal order comprises propagating the domain of defined image data for the particular image from each of the input nodes to the output node.

11. The method of claim 1, wherein the image processing graph comprises a directed acyclic graph.

12. The method of claim 11, wherein the directed acyclic graph comprises a tree.

13. The method of claim 11, wherein at least one of the plurality of nodes is adapted to generate node output data for use by a plurality of other nodes.

14. The method of claim 1, wherein at least one of the plurality of nodes corresponds to at least one of an affine transformation, a convolution, or a Fourier transformation.

15. The method of claim 1, wherein at least one of the plurality of nodes corresponds to at least one of a blur operation, a stretch operation, a skew operation, a rotate operation, a translate operation, or an image warp operation.

16. The method of claim 1, wherein storing an identification of the first traversal order comprises storing a stack data structure identifying the first traversal order, the method further comprising determining the second traversal order based on a last-in-first-out retrieval of data from the stack data structure.

17. The method of claim 1, wherein determining a region of requested node output data for each of the plurality of nodes comprises determining a region of requested node output data for at least one node that is configured to generate node output data for use by a plurality of other nodes.

18. The method of claim 1, further comprising displaying graph output image data, the graph output image data related to a result of using the image processing graph to process the particular input image.

19. A computer program product, tangibly stored on a non-transitory computer-readable medium, comprising instructions operable to cause a programmable processor to:
receive an identification of an image processing graph comprising a plurality of nodes, each of the plurality of nodes corresponding to image processing operation, wherein the image processing graph is adapted to generate an output image based on an input image;
receive input image data relating to a particular input image;
receive region of interest data defining a particular region for which output image data processed according to the image processing graph is requested;
traverse the graph in a first traversal order to determine a domain of defined node output data for each of the plurality of nodes using the input image data;
store an identification of the first traversal order, wherein the stored identification of the first traversal order identifies a first sequence of the plurality of nodes; and
traverse the graph in a second traversal order to determine a region of requested node output data for each of the plurality of nodes using the region of interest data, wherein the second traversal order includes a second sequence of the plurality of nodes, different from the first sequence, and the second traversal order is determined based at least in part on the stored identification of the first traversal order.

20. The computer program product of claim 19, further comprising:
determining a result region for each of the plurality of nodes, wherein the result region for a node is based on the domain of defined node output data and the region of requested node output data for the node; and
generating node output data for the result region for each of the plurality of nodes.

21. The computer program product of claim 19, wherein the input image data identifies a domain of defined image data for the particular input image.

22. The computer program product of claim 21, wherein the input image data identifies the domain of defined image data by a first set of pixel coordinates and the region of interest data identifies the particular region by a second set of pixel coordinates.

23. The computer program product of claim 21, wherein at least one of the domain of defined image data or the particular region comprises a rectangular geometry.

24. The computer program product of claim 19, wherein:
traversing the graph in the first traversal order comprises determining the domain of defined node output-data for a particular node by performing operations associated with at least one preceding node in the first traversal order; and
traversing the graph in the second traversal order comprises determining the region of requested node output data for the particular node based on operations associated with at least one preceding node in the second traversal order.

25. An image processing system comprising:
a storage medium adapted to store:
graph data relating to an image processing graph comprising a plurality of nodes, each of the plurality of nodes corresponding to image processing operation, wherein the image processing graph generates an output image based on an input image;
image data relating to a particular input image;
region of interest data defining a requested region of processed output image data; and
an identification of a first traversal order based on a depth-first search post-order traversal of the graph, wherein the identification of the first traversal order identifies a first sequence of the plurality of nodes;
means for propagating the input image data to each of the plurality of nodes according to the first traversal order; and
means for propagating the region of interest data to each of the plurality of nodes according to a second traversal order, wherein the second traversal order includes a second sequence of the plurality of nodes, different from the first sequence, and the second traversal order is determined based at least in part on the stored identification of the first traversal order.

26. The image processing system of claim 25, wherein the means for propagating the input image data performs operations comprising:
determining if a domain of defined node output data has been calculated for all child nodes of a current node; and
calculating a domain of defined node output data for the current node.

27. The image processing system of claim 25, wherein the means for propagating the region of interest data performs operations comprising:
identifying a next node in the second traversal order; and
calculating a region of requested node output data for the next node.

* * * * *